(12) United States Patent
Tsuchida et al.

(10) Patent No.: US 9,183,861 B1
(45) Date of Patent: Nov. 10, 2015

(54) HARD DISK DRIVE SUSPENSION DIMPLE

(71) Applicant: HGST Netherlands B.V., Amsterdam (NL)

(72) Inventors: Hiroyasu Tsuchida, Fujisawa (JP); Haruhide Takahashi, Odawara (JP); Shinobu Hagiya, Fujisawa (JP)

(73) Assignee: HGST Netherlands B.V., Amsterdam (NL)

(*) Notice: Subject to any disclaimer, the term of this patent is extended or adjusted under 35 U.S.C. 154(b) by 0 days.

(21) Appl. No.: 14/294,861

(22) Filed: Jun. 3, 2014

(51) Int. Cl.
*G11B 5/48* (2006.01)
*G11B 5/55* (2006.01)

(52) U.S. Cl.
CPC ............ *G11B 5/4873* (2013.01); *G11B 5/4826* (2013.01); *G11B 5/5552* (2013.01)

(58) Field of Classification Search
USPC .................. 360/294.3–294.4, 245.1
See application file for complete search history.

(56) References Cited

U.S. PATENT DOCUMENTS

| | | | |
|---|---|---|---|
| 5,299,081 A | 3/1994 | Hatch et al. | |
| 6,078,470 A * | 6/2000 | Danielson et al. | 360/245.1 |
| 6,144,531 A * | 11/2000 | Sawai | 360/245.1 |
| 6,376,964 B1 * | 4/2002 | Young et al. | 310/311 |
| 6,400,532 B1 * | 6/2002 | Mei | 360/245.1 |
| 7,057,857 B1 | 6/2006 | Niu et al. | |
| 7,256,968 B1 | 8/2007 | Krinke | |
| 7,283,331 B2 * | 10/2007 | Oh et al. | 360/245.1 |
| 7,379,274 B2 * | 5/2008 | Yao et al. | 360/294.4 |
| 7,706,106 B1 | 4/2010 | Mei et al. | |
| 7,826,178 B2 | 11/2010 | Honda | |
| 7,835,113 B1 * | 11/2010 | Douglas | 360/245.1 |
| 7,924,530 B1 * | 4/2011 | Chocholaty | 360/245.1 |
| 8,295,012 B1 | 10/2012 | Tian et al. | |
| 2006/0050441 A1 * | 3/2006 | Kang | 360/245.1 |

OTHER PUBLICATIONS

Longqui Li, An experimental study of the dimple/gimbal interface in a hard disk drive, Journal Microsystem Technologies-Special issue: 20th ASME Conference on Information Storage and Processing Systems, Jun. 14-15, 2010, pp. 863-868, vol. 17 Issue 5-7, Jun. 2011, Springer-Verlag Berlin, Heidelberg.

\* cited by examiner

*Primary Examiner* — Wayne Young
*Assistant Examiner* — Carlos E Garcia
(74) *Attorney, Agent, or Firm* — John D. Henkhaus

(57) ABSTRACT

Approaches to a suspension for a hard disk drive (HDD) include a non-hemispherical dimple for movably coupling a flexure with a load beam, where the length of the non-hemispherical dimple exceeds the width. Therefore, in the context of a microactuator system, piezo actuating devices may be installed closer together to improve the microactuator stroke performance in moving the slider over the disk surface.

10 Claims, 4 Drawing Sheets

HARD DISK DRIVE SUSPENSION DIMPLE

FIELD OF THE INVENTION

Embodiments of the invention may relate generally to a hard disk drive and more particularly to a suspension dimple.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator. A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

An HDD includes at least one head gimbal assembly (HGA) that generally includes a slider that houses the head, and a suspension. Each slider is attached to the free end of a suspension that in turn is cantilevered from the rigid arm of an actuator. Several semi-rigid arms may be combined to form a single movable unit, a head stack assembly (HSA), having either a linear bearing or a rotary pivotal bearing system. The suspension of a conventional disk drive typically includes a relatively stiff load beam with a mount plate at the base end, which subsequently attaches to the actuator arm, and whose free end mounts a flexure that carries the slider and its head. It is the job of the flexure to provide gimbaled support for the slider so that the read/write head can pitch and roll in order to adjust its orientation, such as in response to micro-contours of the disk.

Increasing areal density (a measure of the quantity of information bits that can be stored on a given area of disk surface) is one of the ever-present goals of hard disk drive design evolution, and has led to the necessary development and implementation of secondary and even tertiary actuators for improved head positioning through relatively fine positioning, in addition to a primary voice coil motor (VCM) actuator which provides relatively coarse positioning. Some hard disk drives employ micro- or milli-actuator designs to provide second stage actuation of the recording head to enable more accurate positioning of the head relative to the recording track. Milli-actuators are broadly classified as actuators that move the entire front end of the suspension: spring, load beam, flexure and slider. Micro-actuators are broadly classified as actuators that move only the slider, moving it relative to the load beam, or moving the read-write element only, moving it relative to the slider body.

Piezoelectric (PZT) based and capacitive micro-machined transducers are two types of microactuators that have been proposed for use with HDD sliders. The microactuators need to be mechanically and electrically coupled to flexure support structure, with very limited mechanical tolerances. Thus, continued optimization of microactuator and load beam designs is desirable.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are directed to a suspension for a hard disk drive (HDD), and an associated HDD, having a non-spherical dimple for movably coupling a flexure with a load beam. According to an embodiment, the length of the non-spherical dimple exceeds the width, such that microactuator piezo actuating devices may be installed closer together to improve the microactuator performance in moving the slider over the disk surface.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Approaches to a suspension for a hard-disk drive (HDD), having a non-spherical dimple, are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Example Operating Environment

Figure 1:
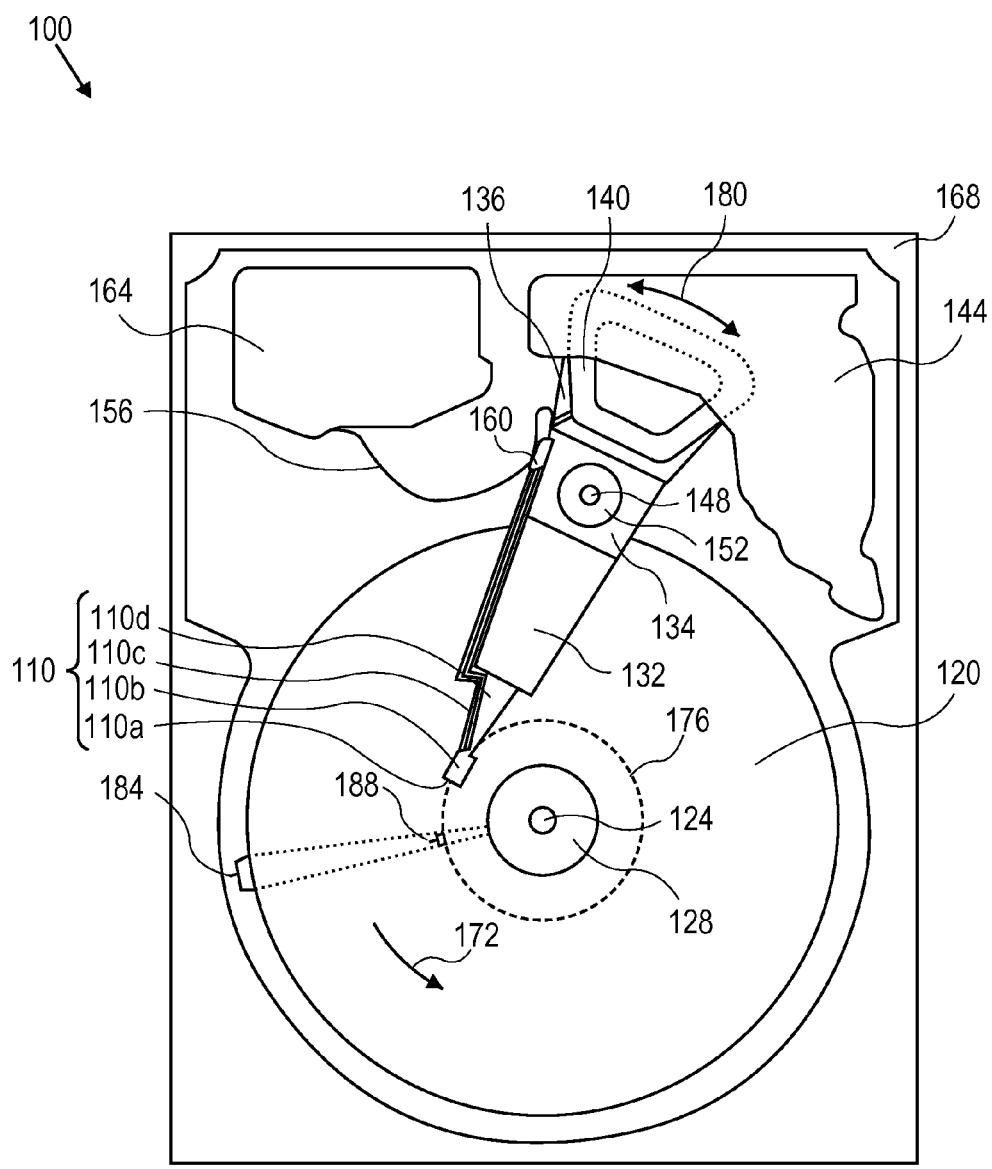
FIG. 1 is a plan view illustrating a hard disk drive, according to an embodiment of the invention.

Embodiments of the invention may be used in the context of improving microactuator performance in a hard-disk drive (HDD) storage device. Thus, in accordance with an embodiment of the invention, a plan view illustrating an HDD 100 is shown in FIG. 1. FIG. 1 illustrates the functional arrangement of components of the HDD including a slider 110*b* that includes a magnetic-reading/recording head 110*a*. Collectively, slider 110*b* and head 110*a* may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one magnetic-recording media 120 rotatably mounted on a spindle 124 and a drive motor (not visible) attached to the spindle 124 for rotating the media 120. The head 110a includes a write element and a read element for respectively writing and reading information stored on the media 120 of the HDD 100. The media 120 or a plurality of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not visible). The armature 136 of the VCM is attached to the carriage 134 and is configured to move the arm 132 and the HGA 110, to access portions of the media 120, being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the media 120 (e.g., magnetic-recording disks) for read and write operations.

With further reference to FIG. 1, in accordance with an embodiment of the present invention, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a casting, depending upon whether the HDD housing is cast, in conjunction with an HDD cover provides a sealed, protective enclosure for the information storage components of the HDD 100.

Continuing with reference to FIG. 1, in accordance with an embodiment of the present invention, other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the media 120 that is affixed to the spindle 124 by the disk clamp 128; as a result, the media 120 spins in a direction 172. The spinning media 120 creates a cushion of air that acts as an air-bearing on which the air-bearing surface (ABS) of the slider 110b rides so that the slider 110b flies above the surface of the media 120 without making contact with a thin magnetic-recording medium in which information is recorded.

The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the media 120. Information is stored on the media 120 in a plurality of stacked tracks arranged in sectors on the media 120, for example, sector 184. Correspondingly, each track is composed of a plurality of sectored track portions (or "track sector"), for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

References herein to a hard disk drive, such as HDD 100 illustrated and described in reference to FIG. 1, may encompass a data storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differs, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

Embodiments of the invention are relevant to HGA microactuator designs. For example, embodiments may be particularly applicable to, but are not limited to, a flexure-integrated microactuator system such as the one described in U.S. Pat. No. 8,085,508 ("the '508 patent), the subject matter of which is incorporated by reference for all purposes as if fully set forth herein. The microactuator system described in the referenced '508 patent comprises two piezoelectric (PZT) motors placed within the flexure gimbal and located just proximal to the slider when viewed from the point of origin of the primary VCM actuator. Such PZT motors are typically configured to rotate a portion of the flexure to which the slider is attached, and therefore rotate the slider itself, about a dimple located on the load beam or possibly on the flexure. Thus, the dimple is located somewhere between the longitudinal axes of the two PZT motors.

One approach to improving the stroke of a microactuator system is to minimize the distance between the PZT motors. Narrowing the distance between the PZT motors improves, or increases, the stroke of the microactuator system by way of a reduction in the yaw stiffness of the system, where yaw is the plane or direction in which the microactuator system actuates, or rotates. However, in order to avoid PZT-dimple contact, narrowing the distance between the PZT motors is limited in the context of a typical hemispherical dimple. Furthermore, if the diameter of the hemispherical dimple is simply made smaller, the machine stress load on the load beam/dimple material during fabrication is too high and it is therefore difficult to achieve the desired dimple height.

Gimbal Assembly

Figure 2:
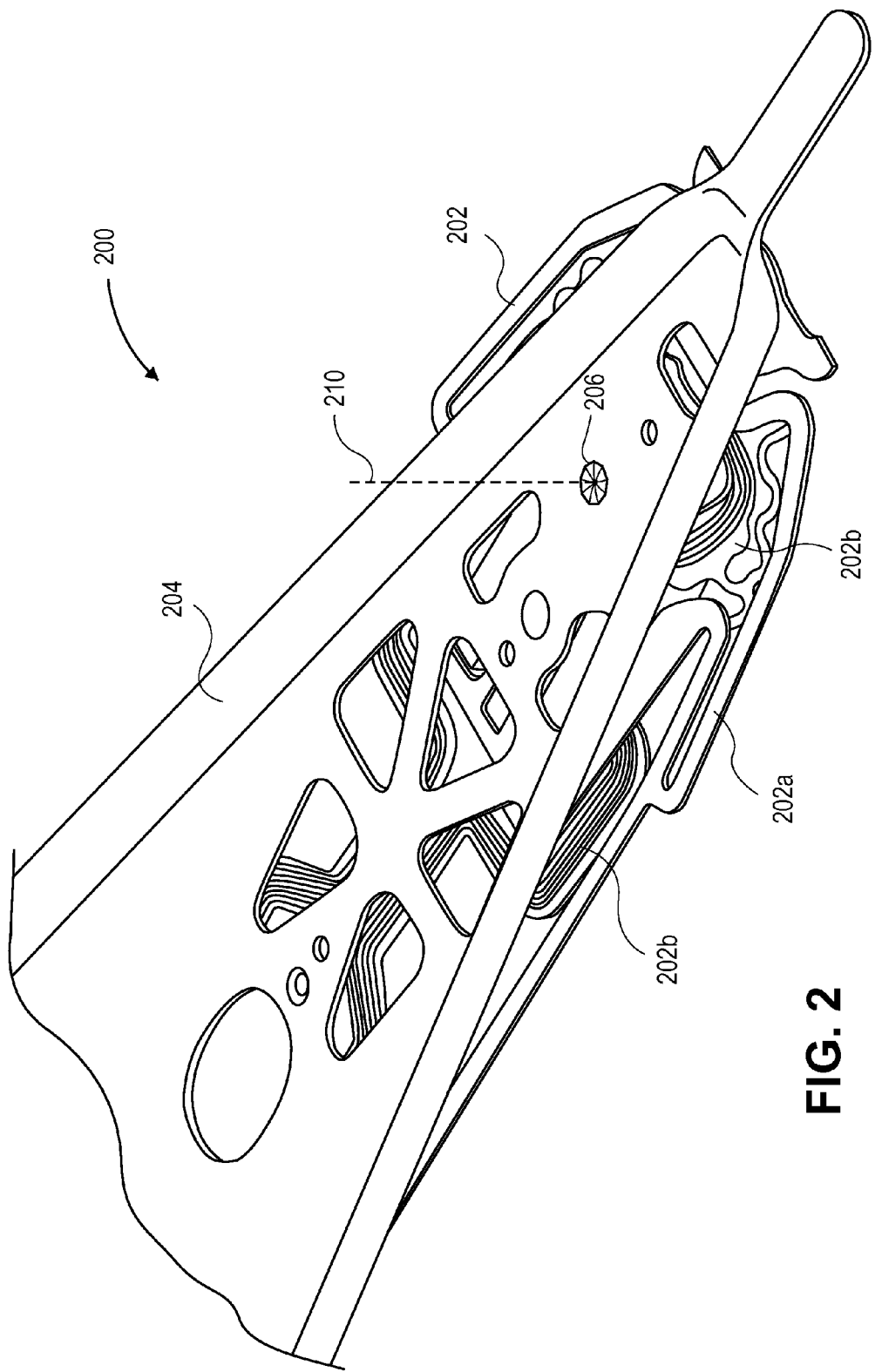
FIG. 2 is a perspective view illustrating a head gimbal assembly (HGA), according to an embodiment of the invention.

FIG. 2 is a perspective view illustrating a head gimbal assembly (HGA), according to an embodiment of the invention. HGA 200 comprises a flexure assembly 202 and a load beam 204 having a dimple 206. The dimple 206 depicted in FIG. 2 is a typical hemispherical dimple. The component on which the dimple is formed may vary from implementation to implementation. For example, dimple 206 could be a constituent of the flexure assembly 202 rather than the load beam 204. Flexure assembly 202 may comprise multiple assembled layers such as a stainless steel layer 202a (also referred to as a "spring layer" due to one of its functional characteristics) coupled with an insulator (or "insulating") layer 202b. Flexure assembly 202 may also, but need not, comprise a separate conductor layer, as described in the '508 patent. Flexure assembly 202 is movably coupled to the load beam 204 via the dimple 206 and has freedom of rotation about the dimple axis 210. Because a slider is coupled to a slider attachment platform 302 (FIG. 3) of flexure assembly 202, the slider likewise has freedom of rotation about dimple axis 210.

Figure 3:
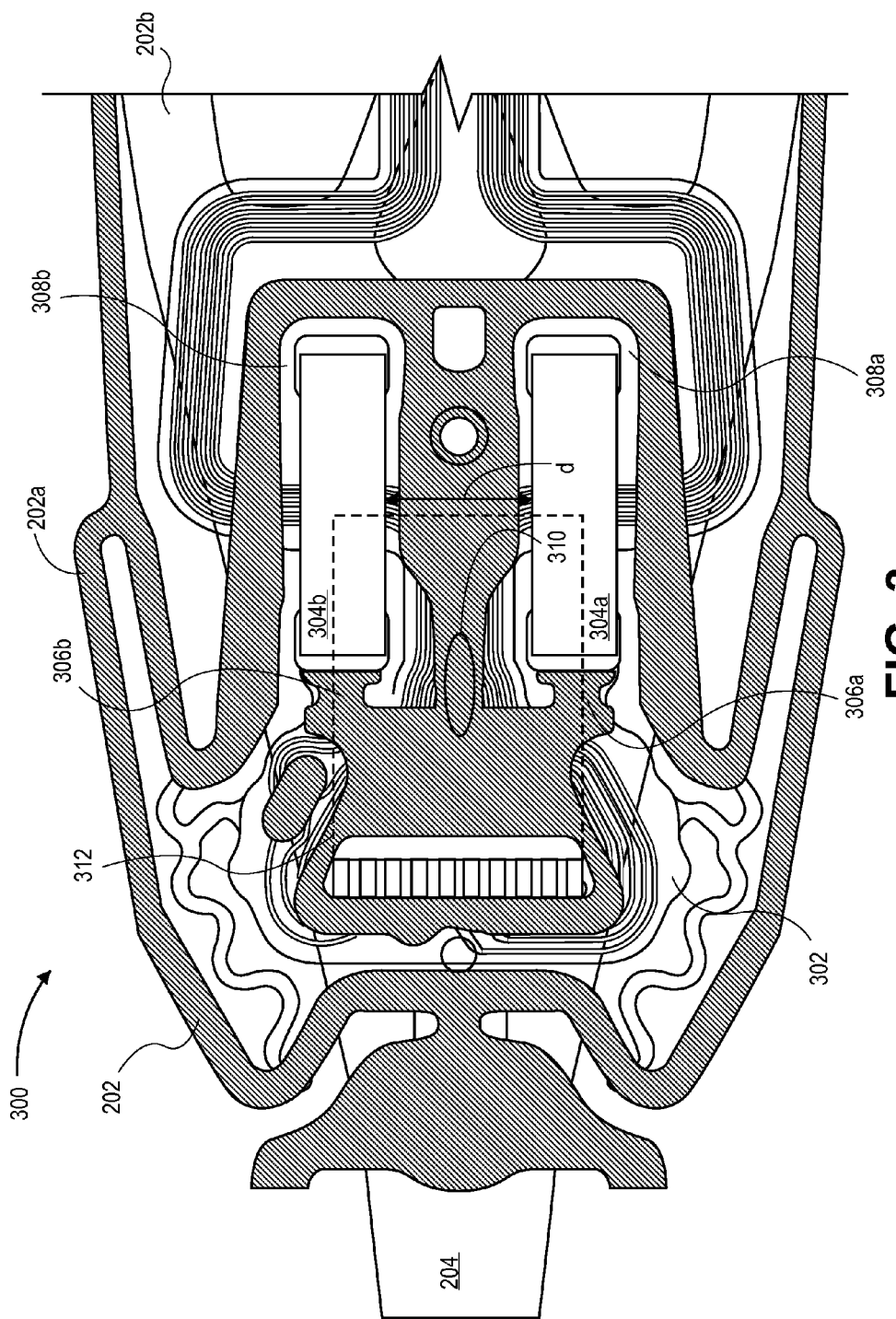
FIG. 3 is a bottom plan view illustrating a flexure gimbal assembly, according to an embodiment of the invention.

FIG. 3 is a bottom plan view illustrating a flexure gimbal assembly, according to an embodiment of the invention. Flexure gimbal assembly 300 comprises the flexure assembly 202, which may comprise the stainless steel layer 202a and the insulator layer 202b, movably coupled with load beam 204 through a dimple 310. Flexure gimbal assembly 300 further comprises a slider attachment platform 302 on which a slider 312 (such as slider 110b of FIG. 1) is attached, and a piezo actuating device 304a and a piezo actuating device 304b attached. According to this embodiment the slider 312 and the piezo actuating devices 304a, 304b, are located on opposing sides of flexure assembly 302, where the slider side is arbitrarily referred to as the bottom side and the piezo side is arbitrarily referred to as the top side.

Each piezo actuating device 304a, 304b is mounted at one end (distal end) to a respective piezo hinge 306a and piezo hinge 306b, and at the other end (proximal end) to a respective leading edge portion 308a and leading edge portion 308b, of a flexure tongue. The microactuator selectively rotates the slider 312 about the dimple axis 210 (FIG. 2). Opposite polarity voltage is applied to the two different piezo actuating devices 304a and 304b, such that one piezo expands and the other piezo contracts to rotate the slider 312 under a corresponding moment force. Piezo hinge 306a and piezo hinge 306b allow the two different piezos to simultaneously extend and contract in a linear manner, while allowing the slider attachment platform 302 and the slider 312 to rotate.

Non-Hemispherical Dimple for Gimbal Assembly

According to an embodiment, dimple 310 is a non-hemispherical dimple, as generally depicted in FIG. 3. For example, and according to an embodiment, the shape of the non-hemispherical dimple 310 is substantially an ellipsoid, e.g., a surface all plane sections of which are roughly ellipses, or ovals.

Figure 4:
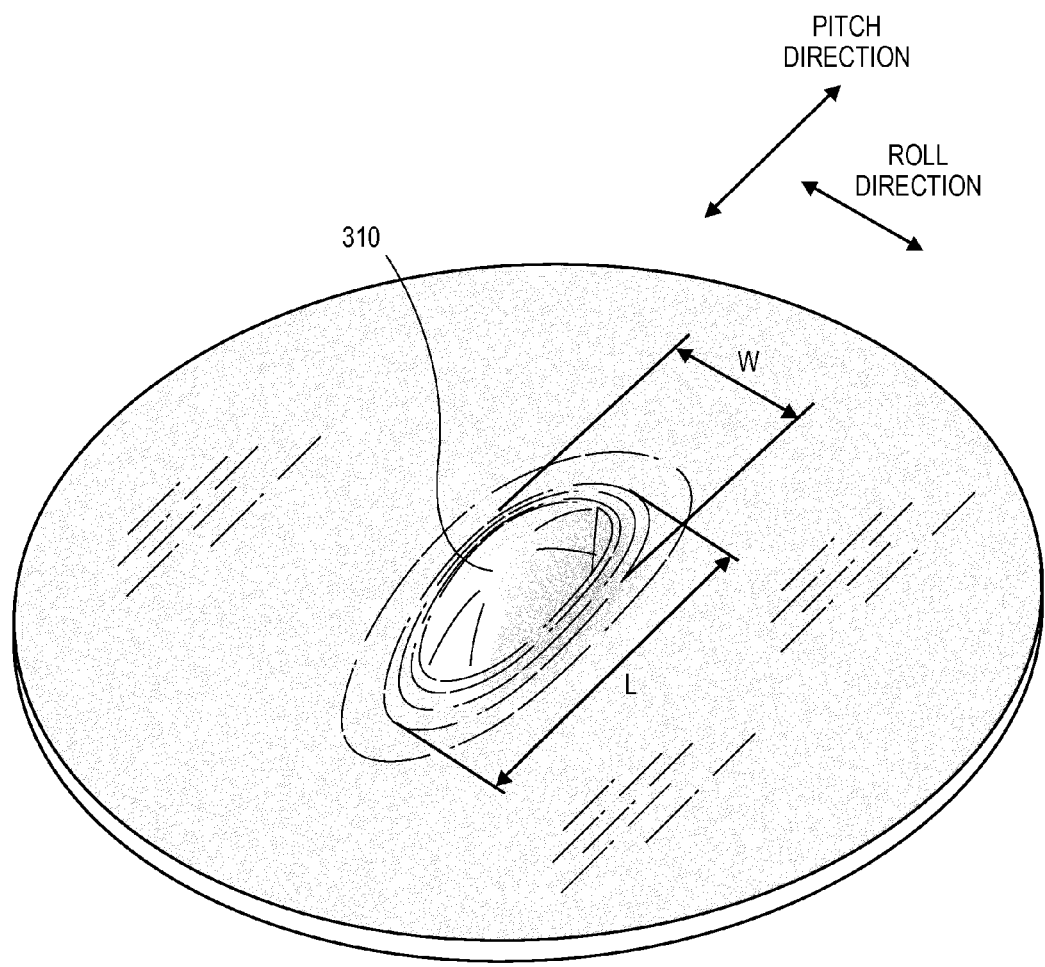
FIG. 4 is a perspective view illustrating a non-hemispherical suspension dimple, according to an embodiment of the invention.

FIG. 4 is a perspective view illustrating a non-hemispherical suspension dimple, according to an embodiment of the invention. As depicted in the enlarged cut-away view of FIG. 4, the three-dimensional non-hemispherical dimple 310 has a length, L, and a width, W, where the direction of the length corresponds with the slider pitch direction and the direction of the width corresponds with the slider roll direction. Thus, the length direction corresponds with the longitudinal direction of the HGA and the width direction corresponds with the transverse direction of the HGA. According to an embodiment, the length L exceeds the width W. However, in view of different design goals a non-hemispherical dimple such as non-hemispherical dimple 310 may be configured such that the width W exceeds the length L.

Compared with typical hemispherical dimple designs, the length L of the dimple 310 may be approximately equal to the diameter of the hemispherical dimple (e.g., 0.5 mm), whereas the width W of the dimple 310 is less than the diameter of the hemispherical dimple (e.g., 0.2 mm rather than 0.5 mm). Thus, with a non-hemispherical dimple structure such as with dimple 310, the stiffness of the flexure 202 (FIGS. 2 and 3) about the gimbal dimple 310 in the pitch direction is greater than the stiffness of the flexure 202 about the gimbal dimple 310 in the roll direction, according to an embodiment. In comparison again with a typical hemispherical dimple, the pitch stiffness of dimple 310 would be about the same but the roll stiffness of dimple 310 is advantageously less than with a hemispherical dimple. However, the configuration of a non-hemispherical dimple may vary from implementation to implementation based, for example, on design goals, microactuator system configuration, mechanical tolerances, and the like. For example, a non-hemispherical dimple configuration may be implemented in which the stiffness of the flexure in the roll direction is made greater than the stiffness of the flexure in the pitch direction, such as with a dimple similar to dimple 310 but rotated 90 degrees. Further, and according to an embodiment, the distance between piezo actuating device 304a and a piezo actuating device 304b can be narrowed to approximately 0.21 mm, thereby improving the stroke of the microactuator system and avoiding PZT-dimple interference.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A suspension for a hard disk drive, comprising:
a load beam comprising a dimple having a surface wherein all plane sections of which, in a direction away from said load beam, are elliptical;
a flexure coupled to said load beam through said dimple, said flexure comprising a slider attachment platform;
a slider coupled to said slider attachment platform; and a microactuator comprising at least two piezo actuating devices separated by said dimple in a transverse direction of said suspension and configured for providing a moment force for rotating said slider about said dimple in response to a microactuator driver;

wherein said dimple has a length in a direction corresponding with a longitudinal direction of said suspension and a width in a direction corresponding with the transverse direction of said suspension, said length exceeding said width thereby narrowing the distance between said piezo actuating devices and increasing the stroke of said microactuator beyond what would otherwise be with a circular dimple having a diameter equal to said length.

2. The suspension of claim 1, wherein the direction of said length corresponds with a pitch direction of said flexure about said dimple and the direction of said width corresponds with a roll direction of said flexure about said dimple.

3. The suspension of claim 2, wherein the stiffness of said flexure about said dimple in said pitch direction exceeds the stiffness of said flexure about said dimple in said roll direction.

4. The suspension of claim 1, wherein said microactuator comprises a first piezo actuating device and a second piezo actuating device, and wherein the distance between said first piezo actuating device and said second piezo actuating device is approximately 0.2 millimeters thereby reducing the yaw stiffness of said microactuator beyond what would otherwise be with a circular dimple having a diameter equal to said length.

5. A hard disk drive, comprising:
a suspension coupled to an actuator arm and comprising,
a load beam,
a flexure coupled to said load beam through a dimple and comprising a slider attachment platform,
a head slider coupled to said slider attachment platform and housing a read/write transducer for reading data from and writing data to a disk media,
a microactuator coupled to said flexure and comprising at least two piezo actuating devices configured for providing a moment force for rotating said slider and a portion of said flexure about said dimple,
said dimple having a surface wherein all plane sections of which, in a direction away from said load beam, are elliptical, wherein said dimple has a length in a direction corresponding with a longitudinal direction of said suspension and a width in a direction corresponding with a transverse direction of said suspension, said length exceeding said width thereby narrowing the distance between said piezo actuating devices and increasing the stroke of said microactuator beyond what would otherwise be with a circular dimple having a diameter equal to said length.

6. The hard disk drive of claim 5, wherein the direction of said length corresponds with a pitch direction of said flexure about said dimple and the direction of said width corresponds with a roll direction of said flexure about said dimple.

7. The hard disk drive of claim 6, wherein the stiffness of said flexure about said dimple in said pitch direction exceeds the stiffness of said flexure about said dimple in said roll direction.

8. The hard disk drive of claim 5, wherein said microactuator comprises a first piezo actuating device and a second piezo actuating device, and wherein the distance between said first piezo actuating device and said second piezo actuating device is approximately 0.2 millimeters thereby reducing the yaw stiffness of said microactuator beyond what would otherwise be with a circular dimple having a diameter equal to said length.

9. The hard disk drive of claim 5, wherein said dimple is a constituent of said load beam.

10. The hard disk drive of claim 5, wherein said dimple is a constituent of said flexure.

\* \* \* \* \*